United States Patent [19]

Schurmann et al.

[11] 4,096,127

[45] * Jun. 20, 1978

[54] ANIONIC POLYURETHANES

[75] Inventors: Horst Schurmann; Josef Bung, both of Duren, Germany; Hendrikus Alouisius Antonius van Aalten, Zevenaar, Netherlands

[73] Assignee: Akzona Incorporated, Asheville, N.C.

[ * ] Notice: The portion of the term of this patent subsequent to Jul. 27, 1993, has been disclaimed.

[21] Appl. No.: 637,701

[22] Filed: Dec. 4, 1975

[30] Foreign Application Priority Data

Dec. 7, 1974 Germany .............................. 2457972

[51] Int. Cl.$^2$ ............................................. C08G 18/38
[52] U.S. Cl. .................... 260/77.5 AM; 260/18 TN; 260/29.2 TN; 428/425; 428/537
[58] Field of Search .............. 260/77.5 AM, 29.2 TN, 260/18 TN; 428/425, 537

[56] References Cited

U.S. PATENT DOCUMENTS

| | | | |
|---|---|---|---|
| 3,860,546 | 1/1975 | Tsou | 260/29.2 TN |
| 3,879,450 | 4/1975 | Velker et al. | 260/29.2 TN |
| 3,928,271 | 12/1975 | Matsudo et al. | 260/29.2 TN |
| 3,971,764 | 7/1976 | Schurmann et al. | 260/77.5 AM |
| 3,983,058 | 9/1976 | Hirooka et al. | 260/18 TN |

*Primary Examiner*—Eugene C. Rzucidlo
*Attorney, Agent, or Firm*—Francis W. Young; Robert F. Green

[57] ABSTRACT

A process is provided for making an anionic polyurethane wherein a monomeric, aliphatic, dihydroxyl compound having an aliphatic substituent containing at least 10 carbon atoms is reacted with an organic polyisocyanate to form an adduct having terminal NCO groups, and the resulting adduct is reacted with an aliphatic monomeric diol chain extender containing an acid group which is capable of salt formation or a salt group. If the chain extender contains an acid group, the chain extended polyurethane is reacted with a basic compound to form a salt. The product of the invention may be used to size paper.

20 Claims, No Drawings

ANIONIC POLYURETHANES

This invention relates generally to polyurethanes and, more particularly, to anionic polyurethanes, processes for their preparation, and their use as sizing agents in the manufacture of paper.

Polyurethanes have been known for a long time. They can be prepared by reacting e.g. polyhydroxyl compounds, such as polyesters, which have hydroxyl end groups, with organic polyisocyanates. In some cases, a so-called preliminary adduct or prepolymer is made first, i.e. one adds an excess of polyisocyanate to the polyester and at a later time adds a so-called chain extender which reacts with the adduct displaying NCO end groups to form the desired polyurethane. Polyurethanes, processes for making them and compounds used for their preparation are disclosed by Saunders and Frisch in *Polyurethanes: Chemical and Technology* published by Interscience Publishers in 1962.

Polyurethanes with an ionic nature are also known. In the preparation of such polyurethanes one can use initial products capable of salt formation, or such which already contain salt groups. These salt-like groups, or groups capable of salt formation, may be present in the chain extender, in the polyisocyanate, or in the polyhydroxyl group, e.g. the polyester, used in the first stage of the preparation.

It is possible to prepare cationic, as well as anionic polyurethanes. Cationic polyurethanes are obtained e.g. by incorporating onium groups in the polyurethanes, or atoms capable of onium formation, such as nitrogen, which is transformed to the positively charged state by means of protonization or alkylation. A salt is obtained thereby, in which the polyurethane molecule is present as cation with an appropriate acid residue. Anionic polyurethanes are prepared by using such compounds in the preparation of the polyurethanes contains an acid group, e.g. the carboxyl group. The polyurethane is transformed into a salt by means of neutralization with an appropriate base and the polyurethane molecule is then present as anion. In the preparation of anionic polyurethanes it is of course also possible to use from the very beginning a reactant present in the form of a salt.

Numerous methods for the preparation of anionic polyurethanes are already known. For example, German Patent Disclosure No. 1,495,847 describes a process in which polyhydroxyl compounds, such as polyesters, polyacetals, polyethers, etc., are reacted. According to the teaching of this Disclosure, the products described there are suitable for the coating and impregnating of woven and non-woven textiles, leather, paper, wood, metals, for antistatic and crease-resistant finishing, as binders for non-wovens, adhesives, adhesion promoting agents, coating agents, hydrophobing agents, softening agents, binders e.g. for cork and wood powder, glass fibers, asbestos, materials resembling paper, plastic or rubber wastes, ceramic materials, as auxiliaries in cloth printing and in the paper industry, as additives for polymer dispersions, as sizing agent and for the finishing of leather.

Although a great number of processes for the preparation of anionic polyurethanes is known and numerous additional uses for these compounds have been listed, there still exists a need for improved methods for making anionic polyurethanes that especially display improved characteristics for special uses.

It has now been found that anionic polyurethanes can be especially advantageously prepared through the reaction of an organic polyhydroxyl compound, organic polyisocyanate and chain extender, by reacting a monomeric, aliphatic dihydroxy compound having an aliphatic substituent with at least 10 carbon atoms with an organic polyisocyanate to form a preliminary adduct with NCO end groups, reacting the chains of the resulting preliminary adduct with an aliphatic, monomeric diol having an acid group capable of salt formation, and converting the acid groups wholly or partially to salts by reaction with a base. Alternately, the chains of the preliminary adduct may be extended with an aliphatic, monomeric diol which already contains an appropriate salt group.

According to the invention, the anionic polyurethanes may also be prepared in the following manner. A monomeric, aliphatic dihydroxyl compound containing an aliphatic substituent with at least 10 carbon atoms is reacted with an organic polyisocyanate to form a preliminary adduct containing NCO end groups, the resulting preliminary adduct is allowed to react with a monomeric, aliphatic trihydroxyl compound such as glycerol, 1,1,1-trimethylolpropane, 1,1,1-trimethylolethane in a molar ratio of about 1 : 1, the resulting compound is reacted with a cyclic anhydride of aromatic or aliphatic dicarboxylic acid and then the acid group formed thereby is converted wholly or partly into a salt by reaction with a base. Preferably, the anhydride of an aliphatic dicarboxylic acid with at least four carbon atoms, in particular 4 or 5 carbon atoms is used. Any suitable anhydride of an aromatic dicarboxylic acid may be used. Phthalic acid anhydride maleic acid anhydride succinic acid anhydride and glutaric acid anhydride are especially well suited.

Monomeric, aliphatic dihydroxyl compounds having an aliphatic substituent with at least 16 carbon atoms are especially suitable for practicing the invention. By monomeric aliphatic dihydroxyl compound in the sense of this invention is meant non-polymeric, aliphatic glycols, i.e. low-molecular organic compounds, which have 2 hydroxyl groups in 1,2- or 1,3-, or in some other position, for example $\alpha,\omega$-position. Preferably, use is made of monomeric, substituted, aliphatic dihydroxyl compounds, in which the 2 hydroxyl groups are connected with one another by a maximum of 7 atoms in the aliphatic chain.

The aliphatic substituent which the aliphatic dihydroxyl compound has to have can be located on a carbon atom carrying one of the two hydroxyl groups, but it may also be bonded to a carbon atom located between the carbon atoms showing the two hydroxyl functions. Preferably, the substituent contains 16 to 22 carbon atoms.

Furthermore, it is not absolutely necessary that the aliphatic chain of the glycol by means of which the two hydroxyl groups are connected with one another, contain only carbon atoms; thus, it is also possible for a carbon atom to be replaced by a hetero atom, such as oxygen or nitrogen. If the hetero atom located in the aliphatic chain is nitrogen, the aliphatic substituent with at least 10, but preferably 16 carbon atoms may be bonded directly to the hetero atom.

The aliphatic substituent on the dihydroxyl compound must have at least 10, but preferably at least 16 carbon atoms. It is not absolutely necessary that the substituent is merely an appropriate carbon residue. An RCOO-group, wherein R is an aliphatic residue with at least 9, but preferably at least 15 carbon atoms, is also considered an aliphatic substituent in the sense of this invention. Especially suitable are the mono-fatty esters of a trihydric alcohol such as the glycerin mono-fatty acid esters and trimethylolpropane mono-fatty acid esters, for example glycerin monostearate, glycerin monobehenic acid ester, trimethylolpropane monostearate, trimethylolpropane monobehenic acid ester, glycerin monopalmitate, trimethylolpropane monopalmitate ester, glycerin mono-oleate ester and trimethylolpropane monooleate ester and the like. Additional dihydroxyl compounds having a substituent with the appropriate carbon number that were found to be very suitable within the framework of the invention are 1,2-dihydroxyoctadecane and 1,4-dihydroxyoctadecane.

If there is a hetero atom in the aliphatic chain, then it is a requirement for the process pursuant to the invention that, in the reaction of the dihydroxy compound with polyisocyanates, there is no residue on the hetero atom which could react with isocyanate groups, i.e. that, if e.g. there should be nitrogen in the chain, the third valence has to be substituted by a residue without active hydrogen atoms. Substitution can thereby be carried out in such a way, that an additional amine bond is formed. Compounds of this nature are N,N-bis(hydroxyalkyl)alkylamines, among which preference is given to N-stearyl diethanolamine. It is also possible to make an amide bond, and then obtain N,N-bis(hydroxyalkyl)acid amides.

N,N-bis($\beta$-hydroxyethyl) stearylamide is especially suitable within the framework of the invention.

Reaction of the substituted, monomeric, aliphatic dihydroxyl compound with a polyisocyanate is carried out best in an anhydrous substantially inert organic solvent, preferably in acetone. Additional solvents, which are inert with respect to isocyanate groups, or, compared with the reaction component, show only slight reactivity, are suitable as reaction mediums. Suitable solvents include liquid hydrocarbons, such as tetrahydrofuran, polar solvents such as dimethylformamide, acetamide and the like, halogenated hydrocarbons such as chloroform, perchlorethylene, methylene chloride and the like, ketones such as acetone, methylethyl ketone and the like, esters such as ethyl acetate and the like, and the sulfoxides such as dimethyl sulfoxide and the like.

However, reaction of the aliphatic, substituted dihydroxyl compound with the polyisocyanate can also be carried out without solvent, in the melt.

A catalytic amount of any suitable catalyst for the reaction of the dihydroxyl compound with the polyisocyanate may be used. Examples of suitable catalysts are the organotin compounds such as dibutyl tin dilaurate, stannous octoate and the like, cobalt naphthenate, zinc octoate, as well as the tertiary amines, e.g. triethylamine or 1,4-diaza[2,2,2]-bicyclooctane. Diacteoxydibutyl tin is especially preferred as the catalyst.

Any suitable organic polyisocyanates may be used for the preparation of the preliminary adduct, either aliphatic or aromatic. Mixed aliphatic/aromatic compounds are also suitable. It is possible to use diisocyanates, triisocyanates or poly-functional isocyanates having more than three NCO groups or mixtures thereof. The organic diisocyanates are preferred. Toluylene diisocyanate, diphenyl methane-4,4'-diisocyanate and hexymethylene diisocyanate were found to be expecially suitable. So-called masked diisocyanates can also be used, such as the reaction product of diphenyl methane-4,4'-diisocyanate with 2 mols of phenol.

Among the triisocyanates, mention is made of the addition product of glycerol and 3 mols toluylene diisocyanate. When polyisocyanates with more than 2 isocyanate groups in the molecule are employed, preference is given to the simultaneous use of a substantial proportion of diisocyanates, since uncontrollable cross-linking can easily occur if polyisocyanates with 3 or more isocyanate functions in the molecule are used exclusively, or in a high proportion.

Within the framework of the invention, preference is given to aromatic diisocyanates.

The ratio of the reaction constituents, namely the molar ratio of dihydroxyl compound having an aliphatic chain of at least 10 carbon atoms to polyisocyanate can vary over a relatively wide range. Thus, the molar ratio of this dehydroxyl compound to diisocyanate may be from 1 : 1.1 to 1 : 3. A molar ratio of from about 1 : 1.5 to 1 : 2.5 is preferred. A ratio of exactly 1 : 2 may be used but it is often advisable to use somewhat more diisocyanate and to work with ratios of about 1 : 2.1 to 1 : 2.3.

The resulting preliminary adduct is then allowed to react with an aliphatic diol carrying an acid group capable of salt formation. This reaction is referred to as chain extending. By acid groups within the framework of the invention are meant groupings such as ( —SO$_2$-OH, —COOH), etc. A polyurethane is formed in the case of this chain extending, in which the above-mentioned groups are present. These are then neutralized by reaction with a base, such as an alkali metal hydroxide such as sodium hydroxide or an amine such as triethylamine. The polyurethane is thereby transformed into a salt. The polyurethane molecule is present as anion.

It is, however, also possible to extend the chain with an aliphatic dihydroxyl compound in which an appropriate salt is already present. This means that one uses a chain extender in which the acid group, such as e.g. the carboxyl group, has already been wholly or partly neutralized with a base.

Especially suitable as chain extenders are 2,2-glycerol monosuccinic acid ester, N,N-bis-(2-hydroxyethyl)glycine bis(hydroxymethyl)-propionic acid, trimethylolpropane glycerol monoterephthalic acid ester, N,N-bis-(2-hydroxyethyl)-2-aminoethanesulphonic acid monosuccinic acid ester, trimethylolethane monosuccinic acid ester and similar compounds. During chain extending, the diol can be used in approximately equivalent quantities, referred to the preliminary adduct. However, it is also favorable to use a slight shortage of about 5 to 10 mol % of the diol.

The process provided by the invention leads in a very simple and advantageous manner to anionic polyurethanes with excellent characteristics. The reactions proceed practically quantitatively. There is no formation of by-products. There is also no undesirable cross-linking. Reclamation of the solvent that may have been used is very simple. The individual reactions proceed very rapidly, so that one can reach a high reaction rate with the process of the invention. The successive reactions until the finished anionic polyurethane is obtained may be carried out one after the other in different vessels, but it is also possible to perform the individual reactions in a single tank. Simultaneous reaction of the initial substances required for the formation of the anionic polyurethane pursuant to the invention is also possible. In particular, the chain-extended product can thus be prepared in a so-called one-shot process. Preferably, however, the preliminary adduct is formed first and chain extending is carried out after that.

Variation of the characteristics of the anionic polyurethanes in a wide range is possible through the selection of suitable initial compounds. The solubility, or dispersibility, of the polyurethane can be influenced by varying the proportion of the acid groups, or salt groups in the polyurethane.

The resulting, new, anionic polyurethanes have a long shelf life. They may be processed as dispersions with varying particle size. They can be mixed easily with usual additives and can be processed into shaped substances, such as film. They are likewise suitable for laminating or coating of plastics of the most varied kinds.

It was especially surprising that the anionic polyurethanes prepared according to the invention are very valuable sizing agents for paper.

A further object of the invention is therefore to provide a sizing agent for paper, containing the anionic polyurethanes of the invention. These sizing agents of the invention may be used for the sizing of paper according to processes which are as such known. Thus, the polyurethanes have stood up well as sizing agents for the mass, as well as for the surface of paper. With the sizing agents of the invention it is also possible to perform the two processes simultaneously. Sizing of the mass may also be carried out with known sizing agents, followed by surface sizing with the anionic polyurethanes in accordance with the invention. Further details concerning the sizing of paper can e.g. be found in the book of Engelhardt, Granich and Ritter, "The Sizing of Paper", VEB Fachbuchverlag Leipzig, 1972.

The anionic polyurethanes pursuant to the invention have a very good inherent color. A paper sized with anionic polyurethanes in accordance with the invention has excellent optical characteristics and a very low yellowing tendency.

Although the sizing agents provided by the invention may be processed directly without optical brighteners, it should be emphasized that they are easily miscible with practically all commercial, anionic, optical brighteners, without resulting in separation or difficulties during processing. Likewise, there is no impairment whatsoever of the degree of whiteness. There is also a very good compatibility with other auxiliary materials, such as carboxymethyl cellulose, alginates, anionic paraffin dispersions, etc., as are customarily used in the sizing of paper.

The following should be noted with reference to the measuring methods mentioned in the examples listed below:

1. Degree of sizing with respect to ink, with the Hercules sizing tester, is determined in accordance with the operating instructions of the manufacturing firm Hercules Inc., Wilmington, Delaware, USA. The time is measured in seconds which passes until the reflectance value drops to 80% of the reflectance value of the paper, when the testing ink is applied to the paper and penetrates the paper.

Testing ink: Paper testing ink, blue, according to DIN 53126.

2. Cobb-Test: (DIN-Standard 53/32 - 1 min.)

Absorptivity with respect to water, expressed in g/m$^2$.

Water uptake after 1 minute of contact with water.

Further details concerning the measuring methods can be found in the above-mentioned book Engelhardt and elsewhere.

3. Angle of Contact

The angle of contact is established with a so-called fogra angle of contact projector, manufactured by Pruefbau, Dr.-Ing. Herbert Duerner, 8123 Peissenberg-/Munich, Aichstrasse 39. It is possible to project an enlarged shadow image of the drop on a screen by means of a projector.

Evaluation is carried out by measuring the base and the height of the drop and by determining the angle of contact, as well as the drop volume with the aid of monograms supplied with the unit. The angle of contact is calculated from the trigonometric ratio of drop base and height.

The degree of wettability, and thus the sizing effect, is determined by measuring the angle of contact of test liquids (e.g. water, ink, solvents) after 30 or 120 seconds after application of the drop.

Further details concerning the method of determination of angles of contact can likewise be found in the book of Engelhardt identified above, on page 192 et seq.

The following are non-limiting examples of the preparation of polyurethane in accordance with the invention.

EXAMPLE 1

A 500 ml 3-neck round-bottomed flask that can be heated and is equipped with an agitator, reflux cooler with drying tube, as well as a dropping funnel, is used as equipment.

17.9 g glycerinmonostearate (0.05 mol) are placed in the flask. Now 45 mg dibutyl tin diacetate, 50 ml anhydrous acetone and 14.72 ml (17.9 g) toluylene diisocyanate-2,4-2,6(80, 20) (0.1028 mol) are added one after the other, followed by heating for 30 minutes until boiling. Subsequently, 11.75 g of the triethylamine salt of 2,2,-bis(hydroxymethyl)propionic acid, dissolved in 50 ml anhydrous acetone, are added drop by drop within 10 minutes. Formation of the polyurethane is terminated after a reaction time of 1 hour with reflux. The solution is clear, moderately viscous and has a slightly yellow color. For purposes of dispersing, 250 ml of deionized water are now added drop by drop while maintaining a slight reflux of the acetone. After removal of the acetone by means of vacuum distillation one obtains an about 17% clear dispersion of the polyurethane ionomer.

EXAMPLE 1a

Example 1 is repeated, but 20.0 g of trimethylolpropane monostearate and 26 mg dibutyl tin diacetate are used instead of 17.9 g glycerin monostearate and 45 mg dibutyl tin diacetate.

EXAMPLE 2

Example 1 is repeated, but 14.65 g of the triethylamine salt of glycerin monosuccinate are used as the chain extending agent instead of the triethylamine salt of 2,2,-bis(hydroxymethyl) propionic acid. The resulting product is a clear, light yellow dispersion of the polyurethane.

EXAMPLE 3

Example 1 is repeated, however, after dispersing, 50 ml of a 1-normal aqueous sodium hydroxide solution are added, followed by distilling off the acetone, as well as the triethylamine that has been set free. The resulting dispersion is clear.

EXAMPLE 4

Example 1 is repeated, however, instead of the salt of 2,2-bis(hydroxymethyl)-propionic acid, the latter is added in pure form. Subsequently, heating to the boiling point is continued until chain extending has taken place completely (about 10 hours). This is followed by neutralization with the equivalent quantity of triethylamine and dispersion and distillation as in Example 1. The resulting dispersion is clear.

EXAMPLE 5

17.9 g of glycerin monostearate, 17.9 g of toluylene diisocyanate, 9.6 g of a glycerin monosuccinate, 45 mg dibutyl tin diacetate and 50 ml of anhydrous acetone are combined in the equipment described in Example 1. The mixture is heated to the boiling point with agitation and allowed to react until the isocyanate content amounts to zero. This is followed by neutralization through the addition of 5.05 g triethylamine and dispersion of the resulting amine salt solution in 200 ml of deionized water. A clear, anionic polyurethane dispersion is obtained after removal of the acetone.

EXAMPLE 6

18.33 g glycerin monostearate and 18.33 g toluylene diisocyanate are dissolved in 39 ml of acetone and, after addition of 0.03% diacetoxydibutyl tin, allowed to react while boiling. 4.72 g anhydrous glycerin are added to the solution after 30 minutes. A slight increase in viscosity can be observed after an additional 90 minutes of reaction time. A solution of 5.12 g succinic acid anhydride in 40 ml of acetone, containing in addition 20 mg of tetraisopropoxytitanium, is added drop by drop after 60 minutes; the substance is neutralized with 5.17 g triethylamine in 50 ml of acetone. After 10 minutes, the resulting, clear, acetone solution is mixed with 200 ml of demineralized water. When the acetone has been distilled off, the result is a clear, stable dispersion.

EXAMPLE 6a

The procedure is the same as in Example 6, however, an equivalent quantity of phthalic acid anhydride is used instead of succinic acid anhydride.

EXAMPLE 7

Example 4 is repeated, however, the equivalent quantity of trimethylolpropane monosuccinic acid ester is used instead of 2,2-bis(hydroxymethyl)-propionic acid.

EXAMPLE 8

Example 4 is repeated, however, the equivalent quantity of trimethylolethane monosuccinic acid ester is used instead of dimethylolpropionic acid.

EXAMPLE 9

Example 1 is repeated, except that after formation of the polyurethane, the acetone solution is evaporated until dryness in a rotary evaporator. The result is a brittle, light yellow product, which can be dispersed in water at 95° C. by stirring for 15 minutes.

EXAMPLE 10

Process according to Example 5, except that the polyurethane is dried before neutralization. The resulting product can be dispersed easily in water at 95° and addition of the appropriate quantity of alkali (degrees of neutralization from 70 to 120% are possible) by stirring.

The following examples illustrate the use of polyurethanes to size paper in accordance with the invention:

EXAMPLE 11

Unsized raw paper with a weight per unit area of 80 g/m$^2$ is treated in the sizing press with a sizing bath containing 5% oxidatively degraded starch and 0.2% bone-dry sizing agent prepared according to Example 2. In the sizing press, the paper absorbs 3.39% dry substance referred to the weight of the paper.

Under otherwise equal conditions, surface sizing is carried out making use of a commercially available anionic sizing agent and the basis of modified maleic acid anhydride - styrene copolymers. The data obtained by measurement of the paper are listed in Table 1.

Table 1

| | Commercial Product | PU-Dispersion according to Example 2 |
|---|---|---|
| Degree of sizing (Hercules, seconds) | 40 | 1000 |
| Cobb value (water) 1 minute | 70 | 22 |

EXAMPLE 12

Surface sizing is carried out under the same conditions as in Example 11, however, with the difference, that use is made of a polyurethane dispersion prepared according to Example 10, with a degree of neutralization of 97% (through addition of aqueous sodium hydroxide). The characteristics found by measuring the paper are compiled in Table 2.

Table 2

| | Commercial Product | PU-Dispersion according to Example 10 |
|---|---|---|
| Degree of sizing (Hercules, seconds) | 48 | 1030 |
| Cobb value (water) 1 minute | 54 | 22 |

EXAMPLE 13

Surface sizing is carried out under the same conditions as in Example 11, however, with the difference that a polyurethane dispersion prepared according to Example 1 is used. In addition, the sizing bath is mixed with 0.5% of a commercially available, conventional optical brightener. The characteristics measured on the paper are compiled in Table 3.

Table 3

| | Commercial Product | PU-Dispersion according to Example 1 |
|---|---|---|
| Degree of sizing (Hercules, seconds) | 30 | 1900 |
| Cobb value (water) 1 minute | 72 | 20 |
| Angle of contact (water) after 30 seconds (degrees) | 71 | 104 |
| Angle of contact (water) after 120 seconds (degrees) | 42 | 95 |

EXAMPLE 14

Surface sizing is carried out under the same conditions as in Example 13, however, with the difference that 1.0% bone-dry sizing agent is used and the bath does not contain any starch. The characteristics as measured on the paper are compiled in Table 4.

Table 4

|  | Commercial product | PU-Disperson according to Example 1 |
|---|---|---|
| Degree of sizing (Hercules, seconds) | 930 | 5320 |
| Cobb value (water) 1 minute | 22 | 16 |
| Angle of contact (water) after 30 seconds (degrees) | 105 | 121 |
| Angle of contact (water) after 120 seconds (degrees) | 93 | 121 |

EXAMPLE 15

Surface sizing is carried out under the same conditions as in Example 11, however, with the difference that 0.2% bone-dry sizing agent, prepared according to Example 8, is used. The data as measured on the paper are compiled in Table 5.

Table 5

|  | Commercial Product | PU-Dispersion according to Example 8 |
|---|---|---|
| Degree of sizing (Hercules, seconds) | 10 | 1930 |
| Cobb value (water) 1 minute | 90 | 21.5 |
| Angle of contact (water) after 30 seconds (degrees) | 64 | 92 |
| Angle of contact (water) after 120 seconds (degrees) | 39 | 84 |

EXAMPLE 16

Surface sizing is carried out under the same conditions as in Example 11. In it, the polyurethane dispersion — as described in Example 1 — is compared with the product manufactured in accordance with the process in keeping with the state of the art, as described in the following.

Anionic polyurethane in keeping with the state of the art as a comparison example:

24.0 g hexanediol adipate (OH number 140, acid number 0.3) are freed from water at 110° C and a pressure of 14 mm Hg for 1 hour. 15.0 g of 4,4'-diphenylmethane diisocyanate are added after cooling to 50° C. The preliminary adduct is cooled (50° C) after heating for 1 hour to 80° C, and dissolved in 100 ml of tetrahydrafuran. 4.0 g of dimethylolpropionic acid are now added, followed by heating for 17 hours at the boiling point. Subsequently, the clear, light yellow, viscous solution is partly neutralized by addition of 20.7 ml of 1 N aqueous sodium hydroxide solution. A dispersion is prepared by adding 410 ml of water drop by drop, while retaining a slight reflux. Removal of the tetrahydrafuran through vacuum distillation results in an about 10%, faintly opaque dispersion.

The results are compiled in Table 6.

Table 6

|  | Product according to the State of the Art | PU-Dispersion according to Example 1 |
|---|---|---|
| Degree of sizing (Hercules, seconds) | 140 | 1350 |
| Cobb value (water) 1 minute | 34 | 20 |

EXAMPLE 17

Surface sizing is carried out under the same conditions as in Example 11, however, with the difference that use is made of 0.75% bone-dry polyurethane dispersion prepared according to Example 6a. The results as measured on the paper are compiled in Table 8.

Table 8

|  | Commercial Product | PU-Dispersion according to Example 6a |
|---|---|---|
| Degree of sizing (Hercules, seconds) | 102 | 4036 |
| Cobb value (water) 1 minute | 34 | 19.7 |
| Angle of contact (water) after 30 seconds (degrees) | 68 | 76 |
| Angle of contact (water) after 120 seconds (degrees) | 53 | 64 |

EXAMPLE 18

A surface sizing is carried out under the same conditions as in Example 11, however, with the difference that a polyurethane dispersion, prepared according to Example 1a is used. The characteristics as measured on the paper are compiled in Table 9.

Table 9

|  | Commercial Product | PU-Dispersion according to Example 1a |
|---|---|---|
| Degree of sizing (Hercules, seconds) | 164 | 1900 |
| Cobb value (water) 1 minute | 33 | 18.1 |
| Angle of contact (water) after 30 seconds (degrees) | 71 | 98 |
| Angle of contact (water) after 120 seconds (degrees) | 54 | 92 |

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. In a process for the preparation of an anionic polyurethane by a process which comprises reacting a polyhydroxyl compound, polyisocyanate and chain extender, the improvement which comprises reacting a monomeric, aliphatic dihydroxyl compound having an aliphatic substituent with at least 10 carbon atoms with an organic polyisocyanate to form a preliminary adduct containing NCO end groups, extending the chain of the resulting preliminary adduct by reaction with a chain extender selected from the group consisting of (1) an aliphatic, monomeric diol containing an acid group which is capable of salt formation and (2) an aliphatic, monomeric diol containing a salt group and, when the chain extender is (1) reacting at least some of the acid groups with a basic compound to form a salt.

2. In a process for the preparation of anionic polyurethanes by a process which comprises reacting a polyhydroxyl compound, polyisocyanate and chain extender, the improvement which comprises reacting a monomeric, aliphatic dihydroxyl compound containing an aliphatic substituent with at least 10 carbon atoms with an organic polyisocyanate to form a preliminary adduct having NCO end groups, reacting the resulting preliminary adduct with a monomeric, aliphatic trihydroxyl compound in a molar ratio of 1 : 1, reacting the resulting product with a cyclic anhydride of a dicarboxylic acid and at least partially converting the acid group formed thereby into a salt by reaction with a base.

3. The process of claim 1 wherein the monomeric, substituted, aliphatic dihydroxyl compound has two hydroxyl groups connected with one another by a maximum of 7 atoms in the aliphatic chain.

4. Process of Claim 1 wherein the monomeric, substituted, aliphatic dihydroxyl compound has an aliphatic substituent with at least 16 carbon atoms.

5. Process of claim 1 wherein the monomeric, substituted, aliphatic dihydroxyl compound is a mono-fatty acid ester.

6. Process of claim 5, wherein the said fatty acid ester is glycerin monostearate.

7. Process of claim 5 wherein the said fatty acid ester is trimethylolpropane monostearate.

8. Process of claim 1 wherein the monomeric, substituted, aliphatic dihydroxyl compound is N-stearyl diethanolamine.

9. Process of claim 1 wherein the monomeric, substituted, aliphatic dihydroxy compound is N,N-bis(β-hydroxyethyl) stearyl amide.

10. Process of claim 1 wherein the monomeric, substituted, aliphatic dihydroxyl compound is 1,2- or 1,4-dihydroxyoctadecane.

11. Process of claim 1 wherein the chain extender is 2,2'-bis(hydroxymethyl) propionic acid, or one of its salts.

12. Process of claim 1 wherein the chain extender is trimethylolpropane monosuccinic acid ester, or one of its salts.

13. Process of claim 1 wherein the chain extender is trimethylolethane monosuccinic acid ester, or one of its salts.

14. Process of claim 1 wherein the chain extender is glycerol monosuccinic acid ester, or one of its salts.

15. Process of claim 2, wherein the said anhydride is an anhydride of an aliphatic dicarboxylic acid with 4 or 5 carbon atoms.

16. Process of claim 2, wherein the anhydride is phthalic acid anhydride.

17. The product of the process of claim 1.

18. A sizing agent for paper containing the anionic polyurethane prepared by the process of claim 1.

19. A process for sizing paper which comprises treating the paper with a sizing bath containing the product of the process of claim 1.

20. A process for making an anionic polyurethane which comprises reacting at the same time a monomeric glycol free from salt forming groups and having an aliphatic chain containing at least 10 carbon atoms and a member selected from the group consisting of a (1) monomeric aliphatic glycol containing an acid group capable of forming a salt group when reacted with a basic compound or (2) a monomeric aliphatic glycol containing a salt group, with an organic polyisocyanate to form a polyurethane when the said group member is (1) converting the acid group to a salt, or a polyurethane salt, when the said group member is (2).

* * * * *

UNITED STATES PATENT AND TRADEMARK OFFICE

CERTIFICATE EXTENDING PATENT TERM
UNDER 35 U.S.C. 156

Patent No.    : 4,096,127

Dated         : June 20, 1978

Inventor(s)   : Horst Schurmann et al

Patent Owner  : Akzona Incorporated

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

I have caused the seal of the Patent and Trademark Office to be affixed this 26th day of November 1990.

Harry F. Manbeck, Jr.
Assistant Secretary and Commissioner
of Patents and Trademarks